US012447735B2

(12) United States Patent
Cooper

(10) Patent No.: US 12,447,735 B2
(45) Date of Patent: Oct. 21, 2025

(54) SYSTEMS AND METHODS FOR FILM POSITIVE PRINT TRANSFERS

(71) Applicant: Todd Cooper, Beverton, OR (US)

(72) Inventor: Todd Cooper, Beverton, OR (US)

( * ) Notice: Subject to any disclaimer, the term of this patent is extended or adjusted under 35 U.S.C. 154(b) by 6 days.

(21) Appl. No.: 17/087,527

(22) Filed: Nov. 2, 2020

(65) Prior Publication Data

US 2021/0129519 A1 May 6, 2021

Related U.S. Application Data

(60) Provisional application No. 62/929,268, filed on Nov. 1, 2019.

(51) Int. Cl.

*B41M 3/12* (2006.01)
*B41F 15/34* (2006.01)
*B41F 16/02* (2006.01)
*B41M 1/12* (2006.01)

(52) U.S. Cl.

CPC .............. *B41F 15/34* (2013.01); *B41F 16/02* (2013.01); *B41M 1/12* (2013.01); *B41M 3/12* (2013.01)

(58) Field of Classification Search

CPC .......... B41F 15/00; B41F 15/08; B41F 15/34; B41F 16/02; B41F 17/00; B41F 17/003; B41F 27/005; B41M 1/12; B41M 3/12

See application file for complete search history.

(56) References Cited

U.S. PATENT DOCUMENTS

| | | | | |
|---|---|---|---|---|
| 3,536,005 | A | 10/1970 | Derrickson | |
| 4,054,091 | A | 10/1977 | Bradley | |
| 4,530,061 | A * | 7/1985 | Henderson | G05B 19/4205 219/121.72 |
| 5,582,104 | A * | 12/1996 | Best | B41F 15/40 101/127.1 |
| 10,035,340 | B1 * | 7/2018 | Juarez | B41M 1/12 |
| 2014/0261029 | A1 * | 9/2014 | Oleson | G03F 7/12 101/129 |
| 2015/0336372 | A1 * | 11/2015 | Van Ness | B05D 3/067 427/508 |

FOREIGN PATENT DOCUMENTS

| | | | | |
|---|---|---|---|---|
| JP | 1062990 | | * 3/1998 | |
| JP | 11271982 | A | * 10/1999 | B41C 1/147 |
| WO | WO-02076759 | A1 | * 10/2002 | B41M 3/148 |

* cited by examiner

*Primary Examiner* — Christopher E Mahoney
*Assistant Examiner* — Marissa Ferguson-Samreth
(74) *Attorney, Agent, or Firm* — J. Curtis Edmondson; Law Office of J Curtis Edmondson

(57) ABSTRACT

Systems and methods for film positive print transfers during screen printing utilize positive artwork, one or more film positive design backups and one or more presses are presented. A screen having positive artwork creates one or more positive artwork design backups, which are stored for later use or used immediately. One or more items are screen printed with the positive artwork design. The one or more positive artwork design backups may be removed from storage and used to transfer the positive artwork to one or more replacement items.

15 Claims, 5 Drawing Sheets

SYSTEMS AND METHODS FOR FILM POSITIVE PRINT TRANSFERS

CROSS-REFERENCE TO RELATED APPLICATIONS

This application claims the benefit of U.S. Provisional Application No. 62/929,268 titled "SYSTEMS AND METHODS FOR FILM POSITIVE PRINT TRANSFERS" which was filed on Nov. 1, 2019 and is incorporated by reference in its entirety.

BACKGROUND

Technical Field

This application relates generally to systems and methods for printing one or more pattern designs onto one or more items, and more particularly, to systems and methods for screen printing one or core pattern designs onto one or more textile items.

Background Information

Screen printing is a technique for creating and embellishing apparel and other textile products with words, designs, patterns and the like, using ink. Screen printing uses special screens which require time-consuming preparation and set up. Each color that is screen-printed requires a separate screen and thus the overall screen-printing process becomes more costly and complex as more colors are used.

Known methods for screen printing designs/artwork onto a material or substrate include direct and indirect screen-printing methods. Direct screen-printing methods print designs directly onto the items, whereas indirect methods print the designs onto a substrate and then utilize a subsequent transfer method to transfer the design (e.g. in ink) from the substrate to a material or a different substrate.

A past published patent for improvements of screen printing include: U.S. Pat. No. 3,536,005 to Derrickson entitled "Vacuum screen printing method". Another published patent in the screen printing arts is: U.S. Pat. No. 4,054,091 to Bradley entitled "Silk screen printing process and apparatus". Likewise, the published U.S. Pat. No. 5,582,104 to Best, et. al entitled "Apparatus and process for screen printing" describes a vacuum printing process.

Direct screen-printing methods require and utilize positive artwork to print designs/artwork directly onto material, i.e. the printing screens include one or more holes/sections that are specifically oriented to create the printed design/artwork when ink, or other liquids, are passed through the holes/sections of the screens directly onto the material or substrate.

On the other hand, indirect screen-printing methods require the use of negative designs/artwork for screen printing to items or materials. In such methods, the negative artwork is screen printed onto a substrate and then transferred/printed onto an item of material. Thus, if a user wanted to use both direct screen printing and indirect screen printing in the same printing run, screens containing positive artwork would have to be swapped out for screens containing negative artwork.

For example, a screen printer may want to use both positive and negative artwork in printing runs where a large number of T-shirts are to be printed and shipped to a client immediately after printing and without closely scrutinizing each T-shirt for errors, expecting that the client will call and report these errors later on. The printer usually anticipates that 2-3% of the T-shirts contain errors and will have to be replaced, i.e. printed again. These errors are usually brought to the printer's attention after a substantial amount of time has passed since the original run and after the original screens have already been removed, destroyed and/or reclaimed/reused). In these situations, screen printers must create entirely new screens and set-up a screen-printing machine for additional printing runs to create replacement t-shirts, all of which burden the printer with additional labor and setup costs.

Moreover, when different colors are used to create more complex and multicolored designs on material, each color that is used requires its own screen or print head. For example, if the American flag was to be printed onto a T-shirt, a first screen would be used to print the design sections of the flag that are red. This red screen would be removed or a different print head used by, for example, rotating a print head to print those design sections of the flag that are white. This screen would then be removed and a different screen would be placed into the press for printing the design sections of the flag that are blue or a print head rotated/removed. Accordingly, if a customer calls to report damaged and/or misprinted American flags on certain goods, and requests reprinting of those goods, the screen printer must create or re-purpose multiple new screens for each of the colors of the flag and setup and operate numerous additional screen-printing runs.

Therefore, there is a continued need in the screen-printing industry for systems and methods of screen printing that are cheaper, simpler, faster and more efficient at handling the demands of smaller, later follow-up screen printing runs to replace goods with errors or other defects that were created during the original printing run.

SUMMARY

The inventor describes the process of creating one or more design backups that has at least one positive artwork; then storing the one or more design backups; followed by the screen printing of at least one positive artwork onto one or more items; then removing the one or more design backups from storage; followed by the transfer of at least one positive artwork from the one or more design backups to one or more additional items. Further illustrated is a method of screen printing where at least one positive artwork is placed onto a transfer substrate. The inventor also describes the method of using disposing plastisol ink placed onto the transfer substrate. Further expressed is a method where one or more design backups onto a press and applying pressure to transfer the at least one positive artwork from the one or more design backups to the one or more additional items. Also illustrated is a method of applying heat to transfer the at least one positive artwork from the one or more design backups to the one or more additional items. Also described is a process where one or more items is one or more textile items. Further illustrated is a method where the transfer substrate is water soluble. Also, the method describes the masking the at least one positive artwork with a non-soluble film.

Further described is a method of creating a screen having at least one positive artwork; then placing the screen into a screen printing press; followed by screen printing the positive artworks onto a transfer substrate; then transferring the at least one positive artwork to one or more design backups; followed by screen printing the at least one positive artwork onto one or more items using the screen; and transferring the at least one positive artwork from the one or more design backups to one or more replacement items. Also illustrated is a method of screen printing the at least one positive artwork onto one or more items using one or more additional screens having the at least one positive artwork, the screen is mesh, and at least a 10 mesh count. Also described is a method where the positive artwork has at least one color. Further described is a method where a screen has at least one positive artwork by coating the screen with polyvinyl textile emulsion; curing the polyvinyl textile emulsion on the s and removing one or more uncured portions of the screen. This method also includes washing the screen with water. Also, this method describes a transfer substrate that is water soluble with the process of masking the transfer substrate with a non-water-soluble masking film; and washing the transfer substrate with water to remove the transfer substrate.

The inventor has also described in this application method for screen printing that has a screen with positive artwork, with the screen printing one or more design backups, followed by screen printing one or more items, and creating one or more replacement items from the one or more design backups.

The inventor has also described in this application, a system for screen printing laving one or more screens having a positive artwork, with a screen-printing machine configured to screen print using the one or more screens. one or more design backups, and one or more presses configured to press and heat the one or more design backups for transfer to one or more replacement items. This system also has one or more screen is made of mesh, and the mesh further comprises a flat surface configured to wash and remove soluble transfer substrates to yield the one or more design backups. Each of the one or more screens is configured to print a different color.

The various embodiments and domains described herein should not be construed as limitations in the potential application of the inventive subject matter. Rather they are teachings for the purpose of illustrating the ramifications and variations of possible embodiments of this inventive subject matter. These and other embodiments are described in more detail in the following detailed descriptions and the figures.

The foregoing is not intended to be an exhaustive list of embodiments and features of the present inventive subject matter. Persons skilled in the art are capable of appreciating other embodiments and features from the following detailed description in conjunction with the drawings.

BRIEF DESCRIPTION OF DRAWINGS

The description below refers to the accompanying drawings, of which.

DETAILED DESCRIPTION

Figures 1A, 1B, 1C:
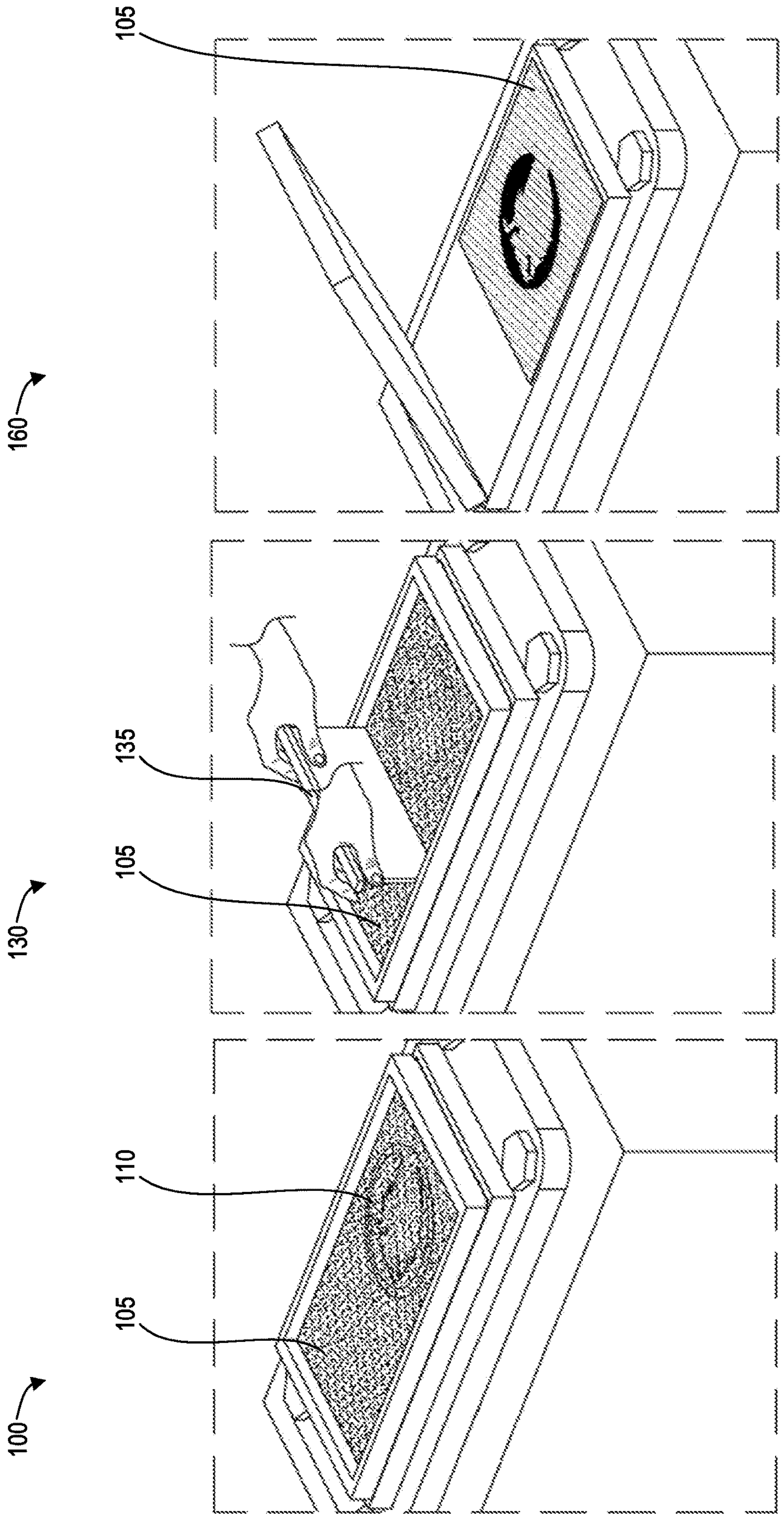
FIGS. 1A-C are snapshot views of creating a screen-printing screen in an illustrative embodiment of the systems and methods.

Systems and methods for a film positive print transfer are described below for screen printing onto a textile/fabric item, though the system and process are not limited to such use.

Prior to the illustrative embodiments of FIGS. 1-4, a rectangular mesh screen (not shown) was prepared by coating the mesh with a polyvinyl textile emulsion, specifically a 2-5 wt % polyvinyl alcohol emulsion solution. A mesh screen having an eighty (80) mesh count was used. Other embodiments may use lower mesh counts, including, for example, 80-350 or even lower mesh count screens. Mesh counts of 25-40, 60, 80-86, 110-160, 180-200, and 230-280 are also appropriate mesh counts. A film positive design in the shape of the design of FIGS. 1-4 was placed onto the rectangular mesh screen over the mesh coated with the emulsion. The mesh screen was then exposed to light for about one (1) minute to polymerize and activate/harden and bind the emulsion to the mesh screen. The portions of the mesh screen covered by the positive artwork and not exposed to the light do not bind to the mesh screen. The positive artwork is then removed from the mesh screen and the mesh screen is rinsed/washed with water, thus removing the emulsion solution that was not bound to the mesh by exposure to light/polymerization. The mesh screen was then placed in a dust-free area to dry. In other embodiments, the screens may be dried in one or more ovens having temperatures not to exceed 104° F., depending on the emulsion solution. The mesh screen is then placed onto a screen-printing press.

Referring now to the systems and methods of the illustrative embodiments of FIGS. 1-4, one or more screen printing transfer mediums or transfer substrates, such as transfer film, having positive artwork are created and stored immediately before a subsequent printing run is run using the same mesh screen having the same positive artwork. The mesh screen 105 is not removed/swapped-out before the printing run is run, thus saving significant time, energy and resources. In other embodiments, one or more printing runs onto goods, for example, t-shirts, may be run/created first before printing the positive artwork onto one or more transfer mediums, such as transfer film, using the same mesh screen and positive artwork as the print run.

In the illustrative embodiments of FIGS. 1-4, the one or more transfer films created using the illustrative embodiments described herein are removed from storage at a later date (not shown) and used to create additional items of the same original design for additional products or replacements articles. For example, after the illustrative embodiments of FIGS. 1-3, a production run of a hundred (100) white, 100% cotton t-shirts was printed (not shown) for a client using positive design/artwork and printing ink directly onto the t-shirts using a screen printing machine and a rectangular mesh screen having one or more open portions, i.e. not coated with a light activated and bound emulsion, corresponding to a positive design/artwork. The t-shirts were then dried by placing the shirts into one or more dryers. Upon drying the t-shirts are then stored. Other embodiments may include laying the t-shirts out to dry for a period of time in the open atmosphere of a room.

In FIGS. 1A-C, a soluble transfer substrate, such as water-soluble transfer film, for screen printing is placed (not shown) under a rectangular mesh screen 105 containing a positive artwork design. A non-phthalate screen ink/plastisol screen ink (not shown) is deposited onto the screen and the ink is pushed, dispersed, etc. over and through the open portions of the screen directly onto the water-soluble transfer film.

FIG. 1A is a snapshot view 100 of the rectangular mesh screen 105 where it includes a circular-shaped positive design/artwork 110 corresponding to and created by openings in the screen.

FIG. 1B is a snapshot view 130 of creating a screen-printing screen in an illustrative embodiment of the systems and methods. In FIG. 1B, a tool 135, such as a scraper or squeegee is used for dispersing and/or pushing the ink through the openings in the rectangular mesh screen 105 corresponding to the design/artwork onto the substrate.

FIG. 1C is a snapshot view 160 of creating a screen-printing screen in an illustrative embodiment of the systems and methods. FIG. 1C illustrates the positive design/artwork that is created by the ink being pushed through the openings in the screen directly onto the rectangular-shaped soluble substrate that was under the screen in Figs. A and B (shaded in FIG. 1C).

Figure 2:
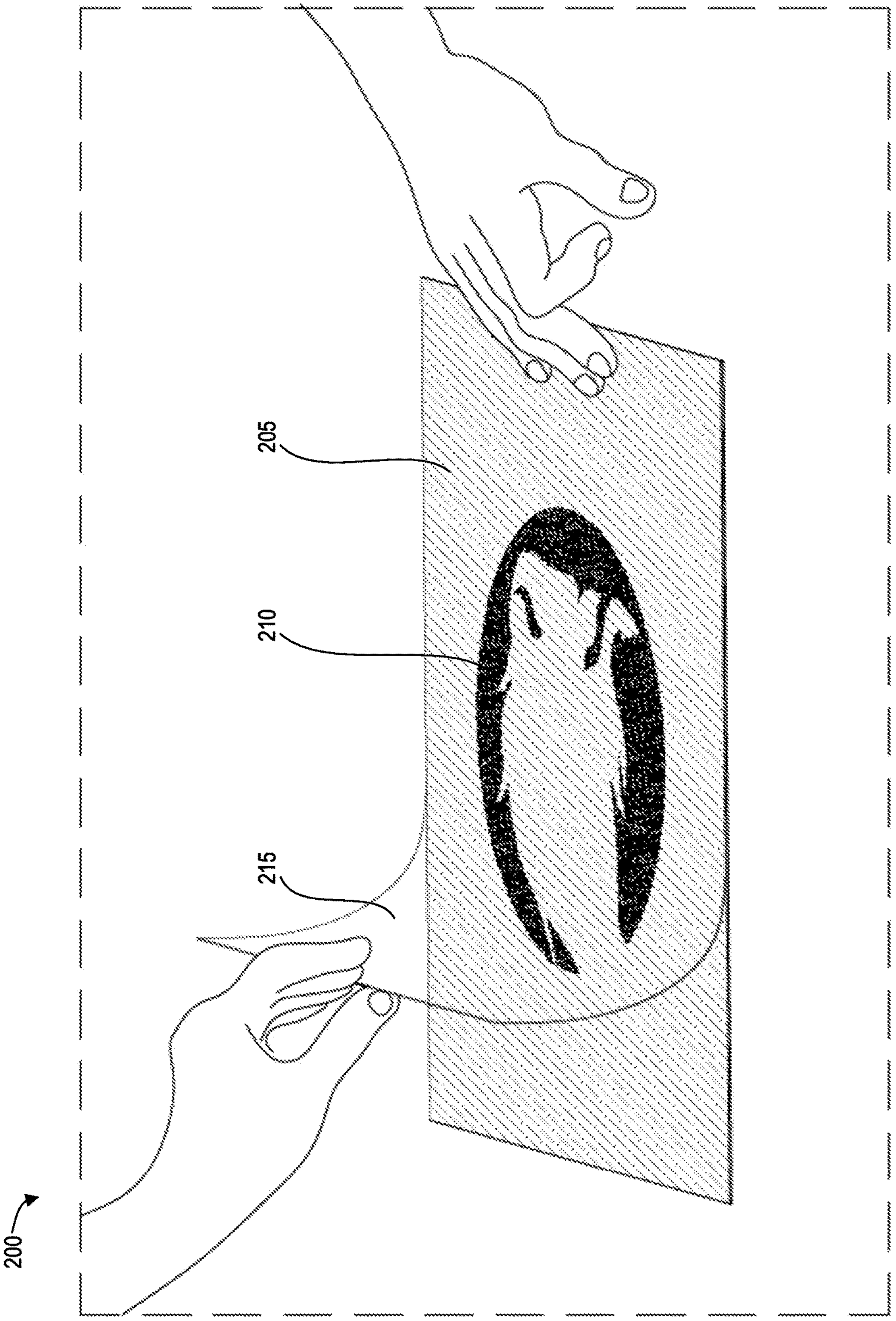
FIG. 2 is a top-down view of a masked, printed design on a soluble substrate of an illustrative embodiment.

FIG. 2 is a top down view 200 of the stored, rectangular-shaped transfer film 205, or transfer substrate, of FIGS. 1A-C with the ink 210 disposed onto the substrate in the shape of the desired positive design/artwork. A clear, adhesive non-soluble film, also referred to as the "mask 215," is placed onto and over the positive design/artwork that was printed onto the soluble substrate (as in FIGS. 1A-C). The clear, adhesive film masks 215/adheres to/bonds to ink 210 in the shape of the design/artwork on the soluble substrate. In other words, the ink 210 depicting the design/artwork is masked and remains on the water-soluble film to create a transfer item or transfer substrate. The ink 210 in the form of the positive artwork adheres to the mask film.

Figure 3:
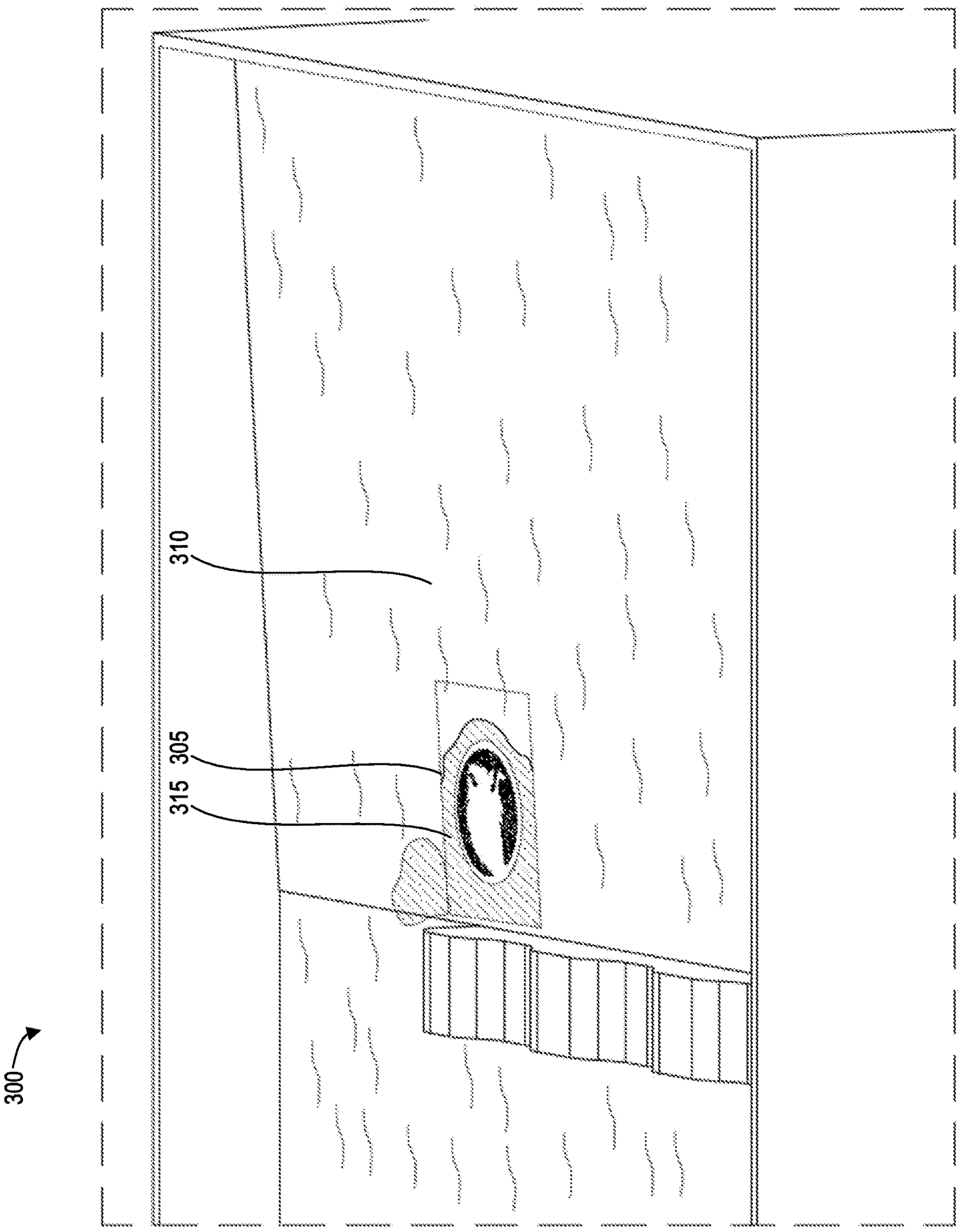
FIG. 3 is a snapshot view of a soluble substrate exposed to a solvent of an illustrative embodiment.

Referring now to FIG. 3, FIG. 3 is a snapshot view 300 where the transfer substrate 305 is placed on a flat surface 310 that is tilted at an angle to drain a solvent 315. The transfer item is washed/exposed to a solvent 315, in this case water, on the surface 310 and the water-soluble substrate is removed from the (1) clear, adhesive film and (2) non-soluble ink attached/adhered to this clear film. The soluble substrate is removed to yield a non-soluble, clear, adhesive film and the non-soluble ink in the shape of the positive design/artwork printed onto, attached, and bonded thereto (referred to herein as "a design backup"). These design backups are film positive because they contain positive artwork. In other embodiments, different soluble substrates and solvents may be used, including, toluene, acetone, diacetone alcohol or a combination thereof. The film positive design backup, or one or more design backups, is then stored for later use (not shown).

Figure 4C:
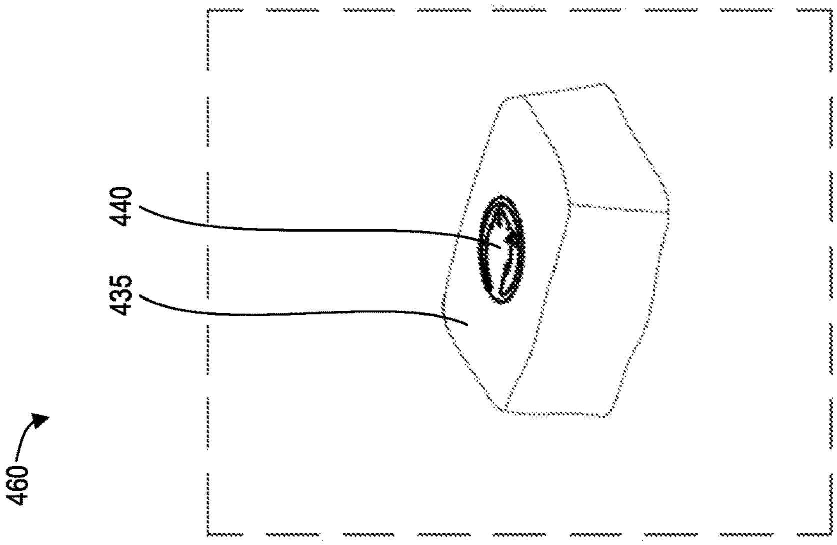
FIGS. 4A-C are snapshot views of applying a masked, printed design onto an item in an illustrative embodiment of the systems and methods.
Figure 4B:
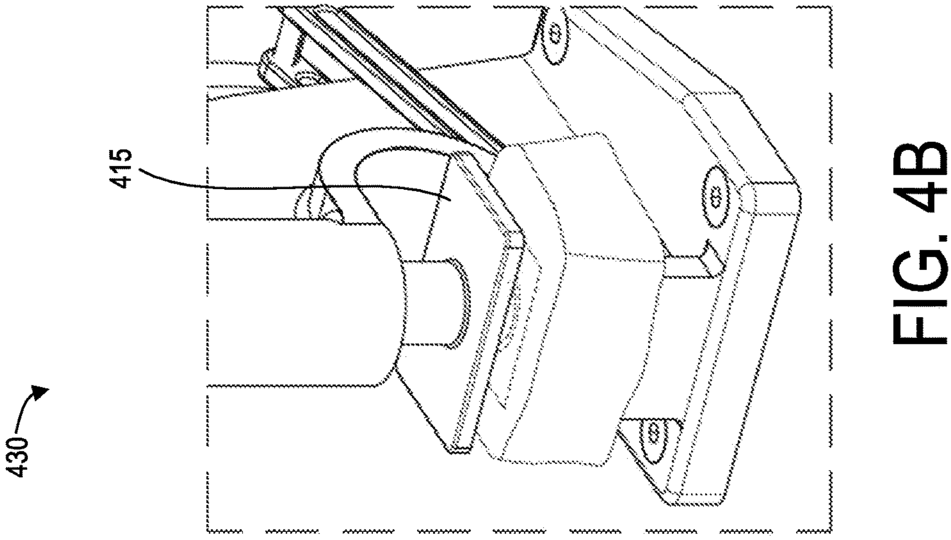
Figure 4A:
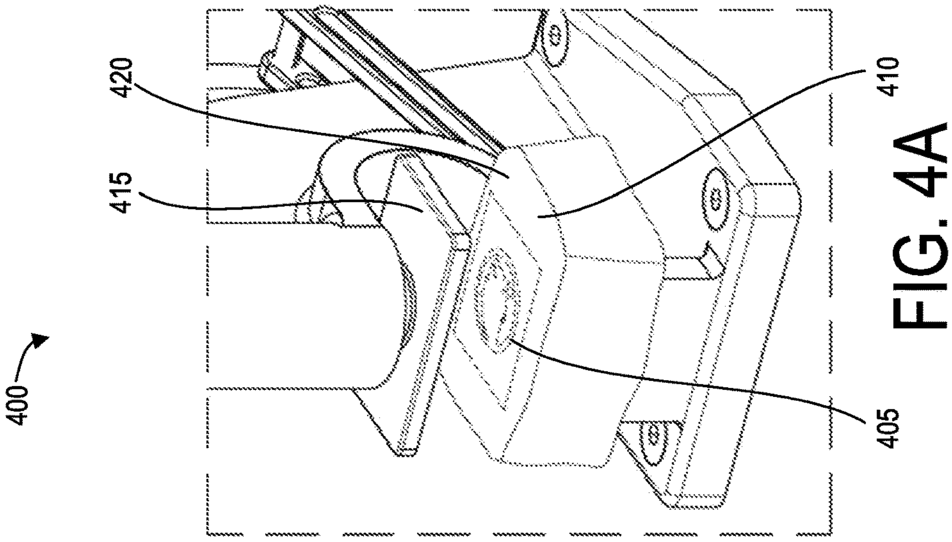
Figure 5:
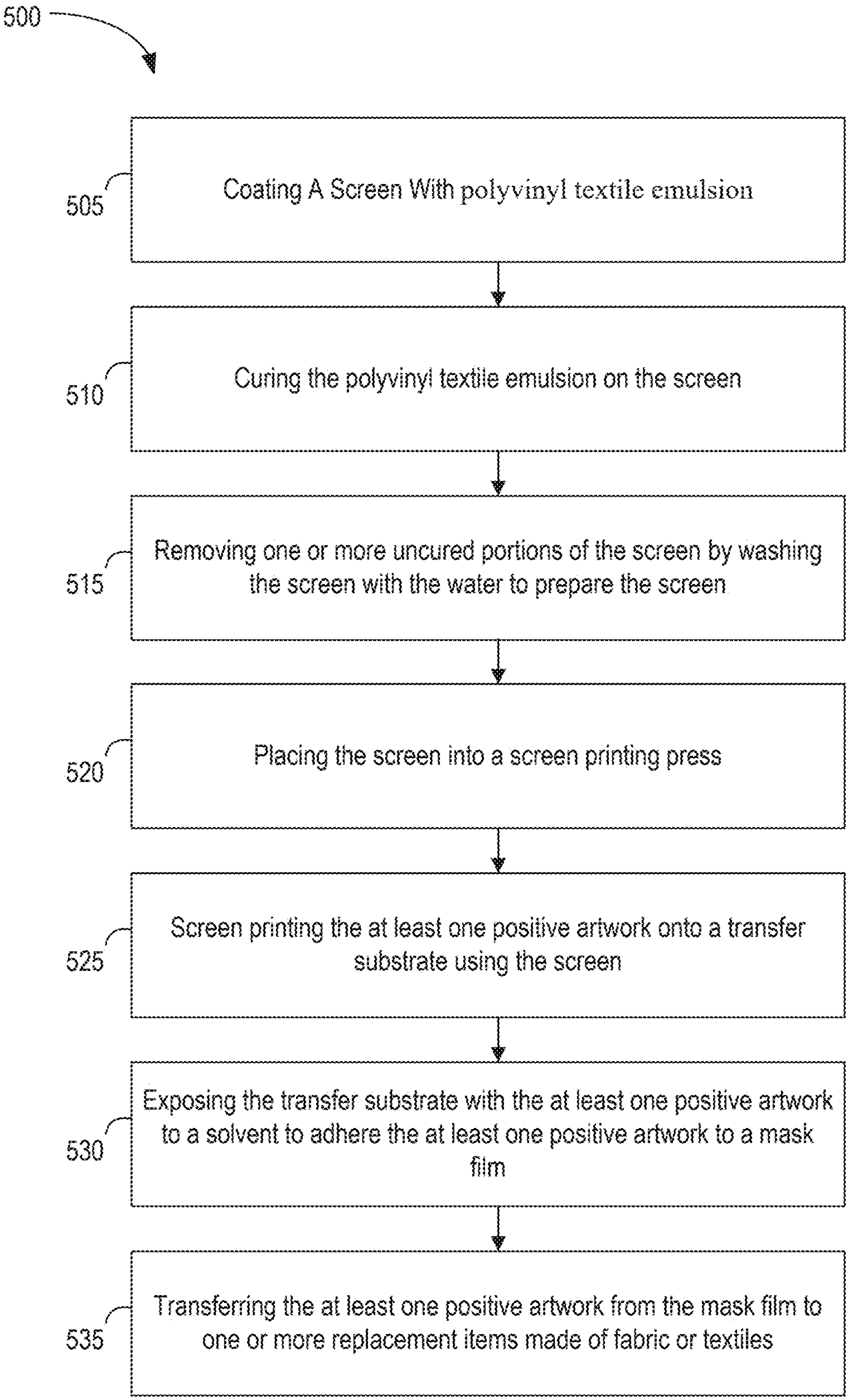
FIG. 5 is a flowchart describing a method for creating and utilizing a design backup in an illustrative embodiment.

In the illustrative embodiments described herein, where 100 t-shirts are printed, about 2-3% of the t-shirts will contain errors. In FIGS. 4A-C, a customer has called to report errors in 2-3% of the t-shirts and one or more stored film-ink combinations are removed from storage (not shown) to be used in creating replacement t-shirts having the design/artwork of FIGS. 1-3.

FIG. 4A is a snapshot view 400 of applying a masked, printed design onto an item in an illustrative embodiment of the system and methods. As illustrated in FIG. 4A, the design backup 405 of FIG. 3, is placed onto a flat surface 410 of a printing press 415, such as a plate. The inked artwork on the adhesive film (design backup) is then placed over/on top of the piece of fabric/textile 420 (e.g., a T-shirt) so as to place the ink in direct contact with the fabric/textile. In the illustrative embodiments of FIGS. 4A-C, the press 415 is of the type as shown, but in other embodiments may be one or more different machines capable of transferring an inked design, whether on adhesive film, to fabric, textiles or other materials, via compression and/or heating by the machine.

FIG. 4B is a snapshot view 430 of applying a masked, printed design onto an item in an illustrative embodiment of the system and methods. FIG. 4B illustrates the printing press 415 of FIG. 4A as it is pressing a member of its apparatus, hydraulic or otherwise, onto the fabric/textile item so as to print, imprint, adhere, attach, bond, or the like, the ink on the adhesive film to the fabric/textile. The apparatuses pressing member may also utilize a heated plate (not labeled), as in FIGS. 4A-C, to help transfer the ink from the adhesive film to the fabric/textile item, in which case heat is applied from the top down onto the design, thus affixing the design to the fabric/textile.

FIG. 4C is a snapshot view 460 of the fabric/textile 435 item as it is removed from the printing press and the ink 440 (in the shape of the design/artwork) remains on the fabric/textile. In the illustrative embodiment of FIGS. 4A-C, a heat press maintains a temperature of 270-340° F.

Other embodiments of the systems and methods may vary the pressure of the press as it is used to transfer a design/artwork, depending on variations in types of, or mixtures of, different inks and/or different materials onto which the ink is being transferred. The temperature of the heated plates or other heating devices may also vary in other embodiments to maximize utility of different inks, machines, items/materials-to-be-printed-on, films or any combinations thereof. A user may also vary the design of the surface or plate onto which an item, such as film, containing a design/artwork is placed. For example, the surface may be sloped, dimpled, rippled or textured, or may be comprised of one or more surfaces, such as two or more plates.

In other embodiments of the systems and methods, one or more printing presses or other similar devices may be used simultaneously or in tandem to create more complex designs. For example, one or more inks may be used and printed-onto/adhered-to an item such as textile/fabric in different locations on the item. Other embodiments may employ one or more artwork/designs, whether of one or more colors, on a single or plurality of machines, including printing presses, so as to layer inked artwork/designs on top of each other thereby creating a more complex design/artwork.

The use of a water-soluble substrate is illustrative of one embodiment. Other solutions that have the same properties as a water-soluble substrates maybe substituted so that the results are equivalent or nearly equivalent.

The systems and methods and the embodiments illustrated herein may also utilize different textiles or fabrics, including cloths made of fibers, such as natural fibers of cotton, wool, silk, hemp, linen, ramie, and the like; regenerated fibers of cupra or rayon; synthetic fibers of acryl, nylon, or acetates or mix-spun cloth of these fibers with other fibers, such as fibers of polyester, vinylin, polypropylene, acetate, triacetate, and the like, dyeable with a soluble dye or pigment colorant.

Furthermore, other embodiments of the systems and methods may begin a production run of one or more items, such as articles of clothing (e.g., t-shirt), by first printing one or more designs or one or more colors onto a transfer substrate for storage and subsequently running a production run of the one or more items.

The process illustrated in the flowchart 500 describes a method for creating and utilizing a design backup for transferring artwork onto fabric or textile items. The process begins with coating a mesh screen with polyvinyl textile emulsion at step 505. The emulsion is then cured to harden and block non-design areas from ink penetration at step 510. Subsequently, uncured portions of the emulsion removed by washing the screen with water at step 515 to prepare the screen. The prepared screen is mounted onto a screen-printing press at step 520, and the desired design, referred to as the positive artwork, is screen printed onto a transfer substrate 525. In some embodiments, an ink is dispersed through the prepared screen to the transfer substrate for screen printed the positive artwork onto the transfer substrate. In some embodiments, using the prepared screen and the screen-printing press, one or more fabric or textile items are printed with the artwork. Further, in some embodiments, a mask film the transfer substrate Next, the transfer substrate with the positive artwork is exposed to a solvent at step 530 by washing the transfer substrate to the solvent, allowing the positive artwork to adhere securely to a mask film. Finally, the positive artwork, along with the mask film, known as one or more design backups, is transferred onto one or more other fabric or textile items at step 535.

The foregoing description has been directed to specific embodiments. It will be apparent, however, that other variations and modifications may be made to the described embodiments, with the attainment of some or all of their advantages. For instance, it is expressly contemplated that the components and/or elements described herein can be used for screen printing onto non-linear substrates, such as metal or plastic bottles and other items. Also, while a particular order of particular treatment processes has been shown and described, those skilled in the art will appreciate that other process orders, arrangements, orientations, etc., may be used to treat water, and that the system described herein is merely an illustrative embodiment. Accordingly, this description is to be taken only by way of example and not to otherwise limit the scope of the embodiments herein. Therefore, it is the object of the appended claims to cover all such variations and modifications as come within the true spirit and scope of the embodiments herein.

All patent and non-patent literature cited herein is hereby incorporated by reference in its entirety for all purposes.

I claim:

1. A method comprising:

preparing a screen having at least one positive artwork;

placing the screen into a screen printing press;

screen printing the at least one positive artwork onto a soluble transfer substrate using the screen;

placing a mask film onto the at least one positive artwork on the soluble transfer substrate subsequent to the screen printing, the mask film is an adhesive non-soluble masking film;

exposing the soluble transfer substrate, with the at least one positive artwork, to a solvent to adhere the at least one positive artwork to the mask film; and transferring the at least one positive artwork from the mask film to one or more replacement items made of fabric or textiles.

2. The method of claim 1, further comprising screen printing the at least one positive artwork onto one or more items made of fabric or textiles using one or more additional screens having the at least one positive artwork.

3. The method of claim 1, wherein the screen is mesh.

4. The method of claim 3, wherein the mesh has a mesh count of at least a 10 mesh count.

5. The method of claim 1, wherein the at least one positive artwork has at least one color.

6. The method of claim 1, wherein preparing the screen having the at least one positive artwork comprises:

coating the screen with polyvinyl textile emulsion;

curing the polyvinyl textile emulsion on the screen; and removing one or more uncured portions of the screen.

7. The method of claim 6, further comprising washing the screen with water.

8. The method of claim 6, wherein the polyvinyl textile emulsion comprises a 2-5 wt % polyvinyl alcohol emulsion solution.

9. The method of claim 6, wherein the polyvinyl textile emulsion is cured on the screen using light.

10. The method of claim 1, wherein the soluble transfer substrate is water soluble, and wherein exposing the soluble transfer substrate with the at least one positive artwork to the solvent to adhere the at least one positive artwork to the mask film comprises:

masking the soluble transfer substrate with the mask film, wherein the mask film is a non-water-soluble masking film; and washing the soluble transfer substrate with water to remove the soluble transfer substrate from the mask film.

11. The method of claim 10, further comprises adhering a non-soluble ink to the mask film in a shape of the positive artwork present on the soluble transfer substrate, subsequent to the washing.

12. A system for screen printing comprising:

one or more screens having a positive artwork;

at least one screen printing machine configured to screen print the positive artwork onto one or more items made of fabric or textiles using the one or more screens, the at least one screen printing machine further configured to screen print the positive artwork onto one or more soluble transfer substrates;

one or more mask films placed onto the soluble transfer substrate subsequent to the screen printing to transfer the positive artwork from the one or more soluble transfer substrates by exposing the soluble transfer substrate, with the positive artwork, to a solvent to adhere the positive artwork to one of the one or more mask films, the mask film is an adhesive non-soluble masking film; and one or more presses configured to press and heat the one or more mask films for transfer of the positive artwork to one or more replacement items made of fabric or textiles.

13. The system of claim 12, wherein the one or more screens is made of mesh.

14. The system of claim 12, wherein the one or more soluble transfer substrates are water soluble, the system further comprising a flat surface configured to wash and remove the one or more soluble transfer substrates to yield one or more design backups.

15. The system of claim 12, wherein each of the one or more screens is configured to print a different color.

* * * * *